United States Patent Office 3,412,058
Patented Nov. 19, 1968

3,412,058
ANTICHECKING WAX FOR RUBBER
Jackson S. Boyer, Claymont, Del., assignor to Sun Oil Company, Philadelphia, Pa., a corporation of New Jersey
No Drawing. Filed Apr. 20, 1966, Ser. No. 543,788
12 Claims. (Cl. 260—4)

ABSTRACT OF THE DISCLOSURE

A rubber composition having improved resistance to oxidation comprising rubber containing 1–30 parts per 100 parts by weight of rubber of an antichecking wax composition consisting essentially of, by weight, 70–99% paraffin wax melting in the range of 120°–138° F. and 1–30% ethylene-vinyl acetate copolymer containing 1 to 60 weight percent copolymerized vinyl acetate.

---

This invention relates to improvements in natural and synthetic rubber compositions. The invention particularly relates to rubber compositions having improved resistance to degradation caused by heat, weathering, and ozone cracking.

The term "synthetic rubber" refers broadly to any organic substance which can be prepared synthetically and which has physical properties resembling those of natural rubber. Hereafter the term "rubber" means solid resinous elastomer, either natural or synthetic.

The desirable physical characteristics of rubber are known to be adversely affected by many deteriorating agents including ozone, heat, oxygen, light, fungi, moisture, and certain metallic ions. The most severe of these adverse effects are known to be caused by ozone, heat, and oxygen in the order named. The deterioration of rubber upon exposure to light and particularly to sunlight is well known. This deterioration usually results in the cracking of the rubber surface, conventionally referred to as sun checking, and usually results in a reduction of tensile strength. Whenever these deteriorating effects occur, the rubber is often considered unusable for the purpose intended. It is particularly important where rubber is utilized as a structural element, such as in the side walls of automobile tires, in rubber mountings, rubber footwear, garden hoses, electrical cable coverings, or any other uses wherein the vulcanized rubber may be exposed to ozone, heat and sunlight, that this degradation does not take place. Generally in the rubber art compositions which are known to inhibit or prevent the above-mentioned type of rubber degradation are often referred to as antichecking compositions, e.g., antichecking wax compositions. Generally deterioration due to exposure to the sun, ozone, and/or heat results in loss of tensile strength in the rubber with the consequence that the rubber fails as a structural or protective component. Generally it has been observed that rubber compositions which are inherently highly saturated are less susceptible to degradation caused by sunlight, heat, and ozone. It is believed that the amount of olefinic unsaturation in a rubber composition can be directly related to the stability or resistance to degradation of that composition. Normally when evaluating rubber compositions, it has been found that the higher the degree of olefinic unsaturation in the rubber composition, the more susceptible that composition is to degradation.

Synthetic elastomers including butadiene-styrene copolymer, butadiene-acrylonitrile copolymers, polyisoprene, polybutadiene, as well as natural rubber have been found to be most susceptible to ozone cracking, due possibly to the presence of a greater number of double bonds. These points of olefinic unsaturation in the rubber composition are particularly susceptible to degradation caused by ozone in the atmosphere. Atmospheric ozone concentrations vary from close to zero to ten parts per hundred million (p.p.h.m.) at Minneapolis, Minn., and increase with higher ambient temperatures and increased air movements. Ozone concentrations up to 50 p.p.h.m. have been reported at Los Angeles and in Alaska. Rubber products which must be used in the vicinity of electrical discharge equipment are subjected to ozone concentrations as high as 10,000–15,000 p.p.h.m.

It has been known in the prior art to incorporate directly into the rubber or elastomer composition various oils, waxes, and other organic and inorganic substances and their derivatives, for preventing deterioration. For example, ozone cracking can be prevented by protecting the rubber or rubberlike surface from contact with the atmosphere by means of protective coatings of 4–8 mils of neoprene or 15–20 mils of vinyl polymer. However, these coatings are costly to apply to items such as tires for vehicles. In addition, the coating is subject to rupture, which results in severe ozone cracking due to concentrated stress relaxation of the rubber substrate at the point of rupture. Wrappers based on polymer films or rubber impregnated paper envelopes or special paper wrappings are adequate in preventing cracking by exclusion of air. U.S. Patents Nos. 2,605,250, 2,632,770, 2,705,224, and 3,032,520 disclose the treatment of natural and synthetic rubbers by adding N-N'-disecondary butyl-p-phenylene diamine and certain oxalate derivatives thereof and others to prevent cracking due to weathering involving either static or dynamic stress while subjected to the influence of oxygen ozone, heat, and/or light.

However, one of the most effective and widely used means of inhibiting rubber degradation (often termed ozone cracking is the addition of certain petroleum waxes to the rubber compound. It has been known since 1881 (German Patent No. 18,740) that addition of wax to the rubber compound will provide protection against this type of deterioration.

The mechanism of the protection afforded by the wax additives appears to result from the fact that the wax makes its way to the surface of the rubber (blooms) and forms a film which protects by keeping the ozone from contact with the rubber. The mechanism of protection as disclosed above indicates that protection of rubber from ozone by means of wax involves close control of a number of factors. In order that blooming may proceed at all, the solubility of wax in rubber must be controlled. If the rate of blooming is too low, the film will be too thin to act as a barrier to ozone; if the rate is too high, the film will probably flake off in service, and the amount of wax remaining may be inadequate to replace the film.

An added difficulty in the evaluation of the effectiveness of the wax used is the inability to obtain precise correlation between reproducible laboratory conditions of rubber exposure and the non-reproducible conditions which the rubber article will encounter.

It has been reported by Ferris et al. ("Symposium of Effect of Ozone on Rubber," ASTM Tech. Spec. Publication No. 229, p. 72), that paraffinic (petroleum) waxes melting in the range of 140°–150° F. are the only waxes effective in protecting rubber in outdoor testing. It was further reported that low melting petroleum waxes, both paraffinic and microcrystalline, are ineffective as degradation inhibitors (antichecking waxes) in rubber compounds in outdoor and/or high temperature environments. Until now low melt petroleum waxes have been ineffective as agents to protect rubber from ozone cracking and degradation, and their use in commercial applications in this respect was not feasible. This problem has now been overcome. It has been discovered that the addition of certain ethylene-vinyl acetate copolymers to low melt paraffin waxes results in a wax composition which, when added to rubber compositions in the prescribed amounts, effectively protects those rubber compositions from the adverse effects of degradation.

Briefly, it has been discovered that an antichecking wax composition comprised of 1–30 weight percent of ethylene-vinyl acetate copolymer containing 1–60 weight percent polymerized vinyl acetate and 70–99 weight percent of low melting paraffin wax is effective in preventing degradation of rubber when added thereto.

It is an object of this invention to provide a low melting wax composition which is an effective antichecking wax composition.

Specifically it is an object of this invention to provide an antichecking petroleum wax composition containing low melt paraffin wax and ethylene-vinyl acetate copolymer.

It has been discovered that the addition of prescribed amounts of ethylene-vinyl acetate copolymer to low melting paraffin wax provides a new antichecking wax composition.

The preparation of ethylene-vinyl acetate copolymer is known in the art. For example, a method of preparing the copolymer is disclosed in U.S. Patent No. 2,200,442 to Perrin et al. The ethylene-vinyl acetate copolymers particularly suitable for the purposes of this invention are those copolymers having a copolymerized vinyl acetate content of from about 1 to about 60% by weight, preferably from about 15% to about 30% by weight. Generally, such copolymers can be prepared by copolymerizing a mixture of ethylene and vinyl acetate in the presence of a catalyst such as oxygen, or an organic peroxide such as t-butyl hydroperoxide at pressures of from about 100 to about 200 atmospheres and temperatures of from about 150° to about 250° C., and then separating the resultant copolymer from unreacted monomers by flashing off the unreacted monomers. By varying the conditions of pressure, temperature, catalyst concentration and vinyl acetate content in the monomer mixture, one can obtain copolymers varying in melt index from about 0.5 to above about 1000.

The relatively low melt paraffin waxes usable in the compositions of the present invention typically have melting points in the range of 120° to 138° F., penetration at 77° F. of from 10–25 (ASTM D1321), a viscosity at 210° F. of from 37 to 41 seconds (ASTM D446). This relatively low melt point paraffin wax may be prepared as follows: A slack wax from the dewaxing of lubricating oil, which can contain about 30% oil, is vacuum distilled and the fraction distilling between about 390° F. and 565° F. at 2 mm. of mercury pressure is collected. This fraction is dissolved in a solvent, preferably a mixture of methylethyl ketone and benzene in about equal volumes. Dissolution is performed at an elevated temperature, from about 165°–196° F. being suitable, and advantageously about 6 parts by volume of solvent per part of wax is used. The solution is slowly cooled to a temperature of from 75° F. to 83° F. and the wax which precipitates at this temperature is separated such as by filtration. The solution separated from the precipitated wax is further slowly cooled to a temperature of from 28°–33° F. and the wax which precipitates at this temperature is separated and recovered. Preferably the wax after separation from solution is washed, such as with the solvent employed for dissolution, preferably at the same temperature as used for filtration, namely, from 28°–32° F., and the wax is then separated.

An alternate method of preparing the wax component suitable for the compositions of the present invention is to separate from slack wax two distillate fractions, one distilling under vacuum in the range of from about 390°–475° F. at 2 mm. of mercury pressure and a second fraction distilling in the range of from about 450°–565° F. at 2 mm. of mercury pressure. As usually occurs, the initial boiling point of the second fraction will overlap the endpoint of the first-mentioned distilled fraction. The lower boiling distillate fraction is dissolved in a solvent as above described and the solution is cooled to a temperature of from 25°–31° F. The wax which precipitates at this temperature is separated as by filtering. The higher boiling distillate fraction is dissolved in a solvent as above described, except that a lower proportion of solvent to wax, say about 4.5 parts of solvent per part of wax, is advantageously used, and the solution is slowly cooled to a temperature of from 72°–82° F. The wax which precipitates at this temperature is separated such as by filtering and the remaining solution is further slowly cooled to a temperature of from 25° to 31° F. The wax which precipitates at this latter temperature is separated as by filtering and is mixed with the wax recovered from the lower boiling distillate fraction. This mixture of waxes is particularly useful in the compositions of the present invention. If desired, the two waxes can be washed and dried prior to blending, or the wet waxes may be combined and simultaneously washed and then recovered by removal of the wash liquid. In general, from about 60 to 75 percent by weight of the paraffin wax will comprise wax from the lower boiling distillate fraction since, as has been found, such mixture gives a wax having properties within those defined for the paraffin wax of the present invention.

The ethylene-vinyl acetate copolymer is compatible with paraffin wax and presents no problem in compounding the compositions of the present invention. A suitable and simple method of obtaining a blend of the paraffin wax composition of the present invention comprises heating the wax to about 150° F. to 300° F. and adding the desired amount of the ethylene-vinyl acetate copolymer to the molten wax while stirring. The subsequently cooled blend provides a solution of ethylene-vinyl acetate copolymer and wax suitable for the purposes of the present invention. This wax-copolymer blend can then be added to the uncured rubber composition during the rubber compounding steps or at other convenient times by means of a Banbury mixer, a rubber mill or by other means well known to those skilled in the art.

The antichecking wax composition of the present invention comprise 70–99% of a low melt paraffin wax melting in the range of 120°–138° F. and 1–30 weight percent of ethylene-vinyl acetates copolymer.

The above antichecking wax can be blended with rubber prior to curing in quantities of 1–30 parts of wax composition to 100 parts of rubber on a weight basis.

As an illustration of the effectiveness of the antichecking abilities of the compositions of the present invention the following comparisons are made.

Example I

A rubber composition for the white sidewall part of an automobile tire is compounded of the following components:

| | Parts |
|---|---|
| High modulus crepe natural rubber | 100.0 |
| Stearic acid | 2.0 |
| Zinc oxide | 80.0 |
| Titanium dioxide | 25.0 |
| Phenyl beta naphthylamine | 1.0 |
| Oxodiethylene benzothiazole-2-sulfenamide | 0.8 |
| Benzothiazyl disulfide | 0.1 |
| Diorthotolyguanidine | 0.2 |
| KO blend insoluble sulfur | 6.4 |

This blend is compounded and molded and cured as the white sidewall part of a standard commercial automobile tire by standard procedures well known to those skilled in the art.

Example II

To a rubber composition identical to the rubber composition of Example I are added 7.5 parts of low melt paraffin wax during the compounding step prior to molding and curing the composition in the identical procedure as followed in Example I. The paraffin wax of this composition is characterized as having a melting point of 126° F. (ASTM D87), a penetration of 18 at 77° F. (ASTM D1321), and a S.U.S. viscosity at 210° F. of 38.8 (ASTM D446).

Example III

To a rubber composition identical to the composition of Example I are added 7.5 parts of an antichecking wax composition comprised of 90% by weight of a low melt paraffin wax identical to that of Example II and 10 percent by weight of a copolymer of ethylene-vinyl acetate. The copolymer additive contains 28% by weight copolymerized vinyl acetate and a melt index of 25 (ASTM D1238–57T). The entire composition is blended, molded, and cured in the same manner as the compositions of Examples I and II.

Rubber tires made respectively from the rubber compositions of Examples I, II, and III are mounted on separate wheel rims of the same automobile and are used for a period of six months in normal automobile driving. At the end of the six-month period each tire is recovered from the automobile and examined. The white sidewalls of the tires made from the compositions of Examples I and II are found to contains severe cracks in the white sidewall portion of the tire. This shows that such compositions are unacceptable for commercial use. The white sidewall of the tire made from the composition of Example III contains no cracks in the white sidewall and is considered to be commercially acceptable in that respect.

The improvement achieved in providing a rubber product protected from degradation is amply demonstrated by the above comparison. Example I illustrates the deterioration in the white sidewalls of a tire which results when that tire contains no antichecking compositions. Example II illustrates the fact that low melting paraffin wax alone does not provide sufficient protection to the white sidewalls of tires containing that wax alone as an antichecking agent. Example III illustrates one composition of the present invention which has demonstrated its effectiveness as anticheck rubber composition suitable for commercial use.

The composition of the present invention are equally as effective for use in black rubber tire compositions, wire coating rubber compositions, and any other application of rubber compositions where a stable rubber protected from deterioration by weathering is required.

The invention claimed is:

1. An improved rubber composition comprising rubber selected from the group consisting of butadiene-styrene copolymers, butadiene-acrylonitrile copolymers, polyisoprene, polybutadiene, and natural rubber, and containing 1–30 parts per hundred parts by weight of rubber of an antichecking wax composition consisting essentially of, by weight, 70–99% of paraffin wax melting in the range of 120°–138° F. and 1–30% of ethylene-vinyl acetate copolymer containing 1–60 weight percent copolymerized vinyl acetate.

2. A composition according to claim 1 wherein the rubber is natural rubber.

3. A composition according to claim 1 wherein the rubber is styrene-butadiene copolymer.

4. A composition according to claim 1 wherein the rubber is butadiene-acrylonitrile copolymer.

5. A composition according to claim 1 wherein the rubber is polyisoprene.

6. A composition according to claim 1 wherein the rubber is polybutadiene.

7. A composition according to claim 1 wherein the copolymer contains 5–30 weight percent copolymerized vinyl acetate.

8. A composition according to claim 2 wherein the copolymer contains 5–30 weight percent copolymerized vinyl acetate.

9. A composition according to claim 3 wherein the copolymer contains 5–30 weight percent copolymerized vinyl acetate.

10. A composition according to claim 4 wherein the copolymer contains 5–30 weight percent copolymerized vinyl acetate.

11. A composition according to claim 5 wherein the copolymer contains 5–30 weight percent copolymerized vinyl acetate.

12. A composition according to claim 6 wherein the copolymer contains 5–30 weight percent copolymerized vinyl acetate.

References Cited

UNITED STATES PATENTS

| 3,112,285 | 11/1963 | Phelan | 260—28.5 |
| 3,321,427 | 5/1967 | Tyran | 260—28.5 |
| 3,338,905 | 8/1967 | Moyer | 260—28.5 |
| 2,692,000 | 10/1954 | Peterson | 260—28.5 |
| 2,534,883 | 12/1950 | Smyers | 260—4 |
| 1,979,946 | 11/1934 | Krauch | 260—28.5 |
| 2,345,717 | 4/1944 | Turner | 260—28.5 |
| 2,662,864 | 12/1953 | Rumberger | 260—28.5 |
| 3,322,708 | 5/1965 | Wilson | 260—28.5 |

MORRIS LIEBMAN, *Primary Examiner.*

B. AMERNICK, *Assistant Examiner.*